INVENTORS
Arjun Dev PASSEY
Jean Raymond MOREAU

*Alan Swabey*

ATTORNEY

United States Patent Office

3,564,723
Patented Feb. 23, 1971

3,564,723
METHOD AND APPARATUS FOR TREATING, PARTICULARLY DRYING, MATERIAL
Arjun Dev Passey, 960 Myrand, and Jean Raymond Moreau, 2998 La Promenade, both of Ste. Foy, Quebec, Canada
Filed Jan. 21, 1969, Ser. No. 792,564
Claims priority, application Great Britain, Feb. 16, 1968, 7,805/68
Int. Cl. F26b 3/00
U.S. Cl. 34—22                                18 Claims

ABSTRACT OF THE DISCLOSURE

A method and apparatus for treating material comprising contacting the material with recirculated superheated vapor. The method and apparatus are particularly suited to dry material using recirculated superheated steam. During the drying operation, a portion of the superheated vapor, after contacting the material, is bled off in an amount substantially equal to the amount of moisture picked up in drying the material.

BACKGROUND OF INVENTION

This invention relates to an improved method and apparatus for treating a product using recirculated superheated vapor.

The invention is particularly directed toward an improved method and apparatus for drying material using superheated steam. The improved method and apparatus can also be used to biologically treat certain substances, particularly food; for sterilization of products or substances; for controlling bacteriological quality in industrial processes, or for treating or drying heat labile materials.

It has been found that material can be dried more efficiently using superheated vapor, and particularly superheated steam, as the drying medium instead of air. One of the basic reasons for the higher efficiency is that the drying process is faster using superheated vapor. When drying by air, the vapors from the liquid in the material being dried must diffuse through an air film to reach the main drying air stream. The vapor at the interface separating the liquid phase from the vapor phase, is at a higher partial pressure than the vapor in the main air stream. The difference in the partial pressures supplies the necessary driving force for the aforesaid mass transfer. In comparison, during the course of evaporation of a liquid into its own superheated vapor, particularly water into superheated steam, such partial pressure differences do not occur. The temperature at the interface of the evaporating liquid and its superheated vapor is higher than the saturation temperature of the superheated vapor at that point. The evaporating liquid is superheated at the interface. The order of a few hundredths degrees Fahrenheit of liquid superheat is sufficient to provide adequate vapor pressure increase to account for mass transfer.

The superheated vapor, particularly superheated steam, can also be used to treat material in an independent step, or in combination with a drying step, to provide improved biological qualities. For example, the superheated vapor can be used for pasteurizing or sterilizing material much more efficiently because of the moist heat conditions present. The use of moist heat results in the rapid inactivation of enzymes in food products. The biological treatment of material using superheated vapor is particularly useful in the drying of milk and other food products where certain types of bacteria might present health or preservation problems.

Another advantage of treating or drying material using superheated vapor is the better retention of product quality, particularly with respect to food, due to processing in the absence of air or oxygen. Oxidizing conditions present during normal drying in air may have a deleterious effect on certain materials, particularly food substances. Drying food products using superheated vapor thus improves their organoleptic qualities. Superheated vapor can also be used for sterilizing equipment and in the control of the bacteriological quality in industrial processes.

SUMMARY OF INVENTION

The present invention provides an improved method and apparatus for treating material using superheated vapor.

More particularly, the invention relates to a method of treating material comprising the steps of recirculating a superheated vapor through a treatment chamber containing the product to be treated, bleeding off a portion of the superheated vapor withdrawn from the chamber in order to maintain a steady state condition and reheating at least the remaining portion of the superheated vapor prior to re-entry into the treatment chamber.

The invention is particularly directed to a method of drying a product using superheated steam comprising the steps of recirculating the superheated steam through a drying chamber containing the material to be dried, bleeding off a portion of the superheated steam withdrawn from the chamber to maintain a steady state condition, and reheating at least the remaining portion of the superheated steam withdrawn from the chamber prior to recirculating it into the chamber.

The invention is further directed toward an apparatus for treating material using superheated vapor comprising a treatment chamber, means for feeding material to be treated into the chamber, means for supplying superheated vapor into the chamber to treat the material, means for withdrawing the superheated vapor from the chamber and recirculating it back into the chamber, means for bleeding off a portion of the withdrawn superheated vapor to maintain a steady state condition in the system, and means for reheating the superheated vapor recirculated back into the chamber.

The method is highly efficient since little energy is required to reheat an amount of superheated vapor as compared to the energy required to resuperheat the same amount of vapor.

The invention is particularly adapted to use steam as the superheated vapor and to dry material using apparatus similar to well-known spray drying apparatus. Other types of drying apparatus can also be adapted to dry materials using superheated vapor, and the superheated vapor can also comprise other suitable vapors, preferably non-condensable, inert vapors, used in combination with steam.

It is important, however, whether using superheated steam, other superheated vapors or a combination of superheated steam and one or more other superheated vapors, in treating the material, that the recirculated vapor be maintained in a superheated condition throughout the system except perhaps where it first contacts the material to be treated.

In using recirculated superheated vapor it has been found that the heat requirements for drying are reduced on the basis of the moisture removed. There is a reduction in the volume flow rate of the drying media when using superheated vapor as compared with the flow rate in drying using air because the heat capacity of the superheated vapor is greater than that of air. The pressure drop through the system and the mechanical power requirements are also reduced. With the reduction in the flow rate a consequent reduction in the size of equipment can also be achieved, leading to further savings. A further advantage is that larger particles can be dried, particularly in spray-drying, partly because of the lower viscosity of the superheated vapor, particularly steam, as compared to ordinary drying media such as air or gases. Further the drying is more rapid, which is significant in the drying of large particles and bulk materials.

The method is more efficient since the vapor picked up from the material, which is bled off during the process to maintain the steady state condition, can be easily used to additionally treat the material before or after the primary treatment step. For example, the drying capacity of spray dryers can be increased at minimum cost by using the vapor bled off to additionally dry the material. Furthermore, in drying products which require compaction or pelletizing the method eliminates the added step normally used when compacting or pelletizing of rewetting the dried product. The method can easily control the moisture level, to which the material is dried, permitting it to be compacted more readily.

In drying particles of material using the improved method, the drying process is characterized by a high heat transfer coefficient and an almost negligible mass transfer resistance, by comparison with conventional air spray drying processes, partly because of the condensability of the drying medium used. Therefore the temperature within each particle is almost uniform and close to the saturation temperature of the superheated vapor. Consequently, regardless of their size and period for which they remain suspended in the superheated vapor, the particles, while being dried, have an almost constant temperature, independent of their position in the dryer, their size, or their residence time in the dryer. The temperature of the particles, during drying, can therefore be directly controlled by regulating the vapor pressure of the superheated vapor. Drying is also independent of outside air conditions.

The method can also be adapted to treat heat labile materials, particularly to evaporate their moisture at lower temperatuers than in the vicinity of 212° F., by operating the apparatus under a suitably reduced water vapor pressure or reduced partial pressure. With more heat resistant materials, on the other hand, one could increase the treatment capacity of the apparatus by operating at a suitable pressure above atmospheric pressure. This provides treatment at a higher temperature when so desired.

Treating material with recirculated superheated vapor produces unexpected advantages in that the flowability of particulate material is improved and color retention is better.

BRIEF DESCRIPTION OF THE DRAWINGS

Several embodiments of the invention will now be described in detail having reference to the accompanying drawings, wherein.

DESCRIPTION OF PREFERRED EMBODIMENTS

While the following description in connection with the figures will relate specifically to drying material, the method and apparatuses described can also be used to treat the material in ways other than drying as previously discussed.

Figure 1:
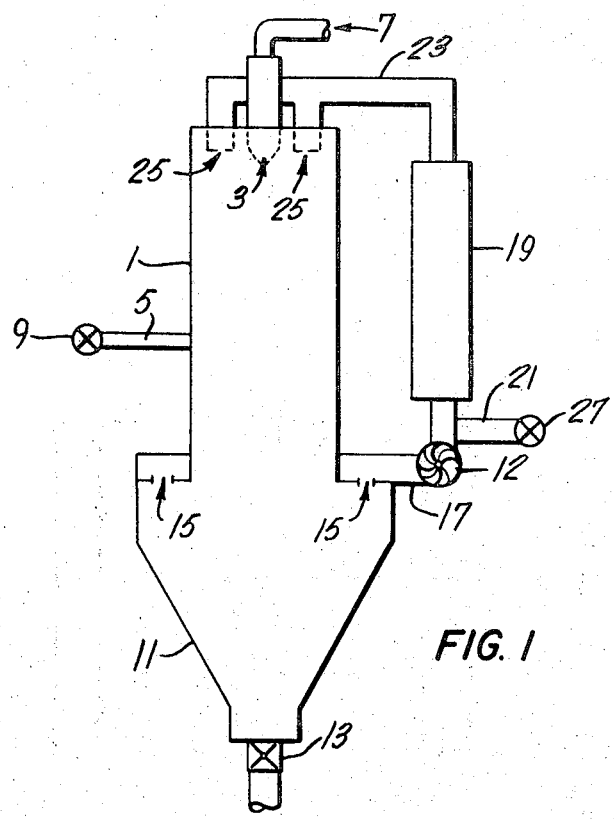
FIG. 1 illustrates an apparatus for spray drying a material using superheated steam.

The use of recirculated superheated vapor to treat a material is particularly suitable for the spray drying of atomizable material, particularly when using superheated steam as the drying medium. Spray drying methods using heated air as the drying medium are well known in the art. FIG. 1 discloses an apparatus for spray drying by the improved method using superheated steam as the drying medium.

In its basic form, the apparatus comprises a vertical spray drying chamber 1 having an upper material inlet 3 and one or more superheated steam inlets 5. The product or material to be dried is fed to the inlet 3 through a line 7. The superheated steam to dry the material is introduced to the chamber 1 from the inlet 5 to at start up, controlled through valve 9. The superheated steam is preferably introduced into the system from inlet 5 prior to beginning drying of the material. The quantity of superheated steam introduced depends on the size of the apparatus and it is recirculated through the apparatus to replace the air therein. Preferably the superheated steam introduced is superheated to approximately 400° F., particularly for drying most biological substances.

After the introduction of the required amount of superheated steam into the chamber 1, the material to be dried is "sprayed" into the chamber 1 through inlet 3 where it comes in contact with the superheated steam, which is now being recirculated through the apparatus, and is rapidly dried. The moisture from the material transfers or passes into the superheated steam and the dried material falls to the conical bottom 11 of chamber 1 from which it is removed through a valve 13. The superheated steam, carrying the moisture picked up from the material, is drawn through an annular outlet 15 in chamber 1 by a fan 12 located in a duct 17 and passes to a reheater 19. During its passage to the reheater 19, a portion of the superheated steam is bled out of the system through a duct 21, the amount of bleed-off being controlled by a valve 27. The amount of steam bled out through the duct 21 is substantially equivalent to the amount of moisture picked up in drying the product, and the purpose of this bleeding-off is to maintain a steady state or balanced thermodynamic condition during the drying process. The bled-off steam, being a source of available energy, may be utilized for several thermodynamic purposes.

The remainder of superheated steam, in passing back through the reheater 19, is reheated again to the appropriate superheated state, compatible with the particular material being dried and recirculated back into and through the chamber 1 through duct 23 and inlets 25 to dry additional material fed into the chamber. Thus, once the drying process has begun, the superheated steam recirculates through the apparatus, including the drying chamber, in a closed cycle except for that portion that is bled off to maintain equilibrium in the system. Once equilibrium or steady state conditions have been established, no further superheated steam should be required to be fed into the system through inlet 5.

However, should there be more steam passing out of duct 21 than the rate of evaporation, make-up superheated steam could be added through inlet 5 to maintain steady flow operation. The amount of steam bleed-off through duct 21 is approximately 5% but will of course vary to maintain equilibrium in the system. The drying temperautre can be directly controlled by regulating the vapor pressure of the superheated steam. The rate of circulation of the superheated steam can depend on the desired rate of drying.

The steam should remain superheated at all times during its recirculation through chamber 1, ducts 17, 23, and reheater 19 to increase the efficiency of the system. If the superheat condition disappears as the steam passes to the reheater, more energy is required to again superheat the steam than is required to merely reheat the superheated steam. For this reason the system should be properly insulated to maintain the steam in superheat condition. However, some initial condensation of the superheated steam can occur on the surface of the material to be dried on its entering the treatment chamber under certain conditions. Whether or not this would happen depends upon several factors, such as the transport properties of the material, its temperature, especially on the surface, as it enters the chamber, its characteristic dimensions, local heat and mass transfer conditions, and the degree of superheat of the steam surrounding it. The condensation that can occur does not greatly impair efficiency. The condensed phase usually soon becomes superheated again within the chamber and re-evaporates into the surrounding superheated steam. The thermodynamic conditions in the drying system can be controlled, by controlling the temperature of the superheated steam, to avoid or minimize cooling the steam to saturation during initial contact with the material to be dried.

Figure 2:
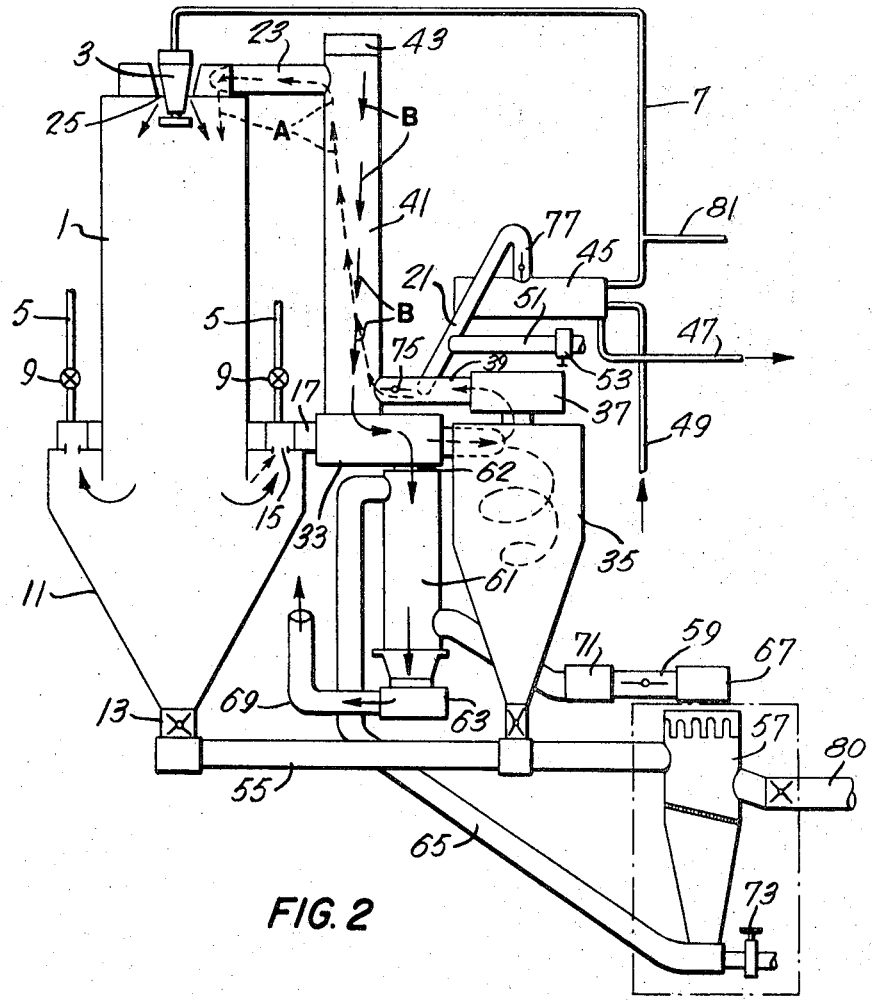
FIG. 2 illustrates the apparatus of FIG. 1 incorporating additional improvements.

A preferred apparatus for using superheated steam to spray dry material is shown in FIG. 2.

The apparatus contains elements similar to those shown in FIG. 1 and which are numbered alike. The apparatus has however additional features for increasing or improving the efficiency of the drying process. The heavier particles of the material being dried in chamber 1 drop down to the bottom of chamber 11 and emerge out of valve 13. Lighter particles of the material will be carried out with the superheated steam through the outlet 15 and into duct 17. The superheated steam together with the particles pass through a first steam reheater 33 into a separator 35 where the lighter particles of the material being dried are separated from the superheated steam. The separator 35 is preferably a cyclone separator although other types can be used. The superheated steam is drawn from the separator 35 by fan 37 into a duct 39 to a second steam reheater 41. The first steam reheater 33 ensures that the steam is maintained superheated while being led from the drying chamber 1 to the separator 35. In the second steam reheater 41, the superheated steam passes upwardly, as shown by the doted arrows A, in countercurrent flow to combustion products, shown by full arrows B, produced by burners 43. The combustion products pass from reheater 41 to reheater 33 to heat the mixture of superheated steam and fine particles. The recirculated superheated steam is heated by the reheater 41 to the required degree of superheat to dry the particular material and is then passed through duct 23 into the drying chamber 1. The superheated steam can be filtered prior to entering the drying chamber. From the fan duct 39 a portion of the superheated steam is bled off by line 21 to maintain steady-state conditions. The amount bled-off is substantially equal to the amount of moisture picked up from the material in drying.

The bled-off steam may be further utilized in the system. As shown in FIG. 2 it may be passed to a pretreatment system 45 to provide a preliminary treatment of the material being dried. The pretreatment system can comprise any well-known system for preheating, enzyme inactivating, blanching, sterilizing the material, pasteurizing, and/or raising the concentration of the material in solution prior to spray drying. The condensed steam leaves the pretreatment system 45 through line 47. The material being dried passes into the pretreatment system from line 49 and leaves through line 7. A portion or all of the bled-off steam from line 21 can be passed to atmosphere or to a further stage to treat the material through a bypass duct 51. The bled-off steam can also be reheated if desired. A valve 53 is located in the bypass duct 51 to control the flow therethrough.

The fine material separated from the superheated vapor in the separator 35 can be combined with the heavier material emerging through the valve 13 from chamber 11 of the drying chamber in a duct 55. The combined dried material from duct 55 can be passed to a supplementary dryer 57, such as a fluidized dryer for example, if desired.

In the supplementary dryer 57 the materials may be further dried, preferably using as a drying medium, one or more inert gases circulating through a return duct 59; a heat exchanger 61 which receives the products of combustion from reheater 33 through duct 62 and carries them in counterflow direction to the inert gases by means of a combustion exhaust fan 63; an inlet duct 65 to the supplementary dryer 57 and a fan 67. The combustion gases pass from exhaust fan 63 through duct 69 to the atmosphere. A dehumidifier 71 can be located in the return duct 59 to dehumidify the recirculating inert gas used for the supplementary drying process. A filter for the recirculating inert gas can also be located in the return duct 59 if desired. The material emerges from the supplementary dryer 57 through an outlet 80.

Control valves 75 and 77 are located in the return duct 39 for the superheated steam and in the bypass duct 21 adjacent the pretreatment system 45 to control the flow of the superheated steam through the system in order to maintain seady-state conditions in the system. The control valve 73 can control the introduction of the supplementary drying medium to the supplementary dryer 57.

In the same manner as for the apparatus shown in FIG. 1, the superheated steam for the system is added to chamber 1, through lines 5 controlled by valves 9. Once equilibrium has been established in the system, no further steam should be required although make-up steam can be added through lines 5 as required.

It is preferred to adequately preheat all the components of the apparatus which may come in contact with the superheated vapor before introducing the superheated vapor into the system, in order to prevent its condensation on the surface of the components.

One way to achieve this preheating of the apparatus is by circulating a heated noncondensable medium, such as air, through the apparatus. Once the apparatus has been adequately preheated, the noncondensable medium can then be purged out of the recirculation circuit to the desired degree, and replaced with the superheated vapor. A procedure for achieving this purging and replacement is described with reference to FIG. 2, and can similarly be extended to other systems.

To aid in the purging operation, valve 77 is completely closed and valve 75 is readjusted to a partially open position. Valve 53 is fully opened and simultaneously superheated vapor is admitted through the one or more superheated vapor inlets 5 while fan 37 is operating. This commences the purging of the noncondensable medium (mixed with superheated vapor) from the system and its replacement with the superheated vapor. This is continued preferably until the medium in the recirculation circuit contains superheated vapor to the desired level. Once this has been achieved, no more superheated vapor should be required and the valves 5 and 53 can be closed.

The operation of the system is now preferably stabilized by introducing water feed at a rate corresponding to the rate of evaporation necessary during the treatment of the substance to be treated. The valves 75 and 77 are repositioned and the rate and extent of reheating the recirculating superheated vapor adjusted in order to maintain steady operation. Make-up vapor can be admitted through one or more of the superheated vapor inlets 5, if necessary or desired.

Once the conditions have stabilized at desired levels, the apparatus is ready for processing the product desired to be treated. The product to be treated can therefore be introduced and water feed may be discontinued.

The apparatus shown in FIG. 2 is further particularly suited for providing compaction and/or aggregation of the product as it emerges from the first drying stage and before or during the supplementary drying stage.

Figure 3:
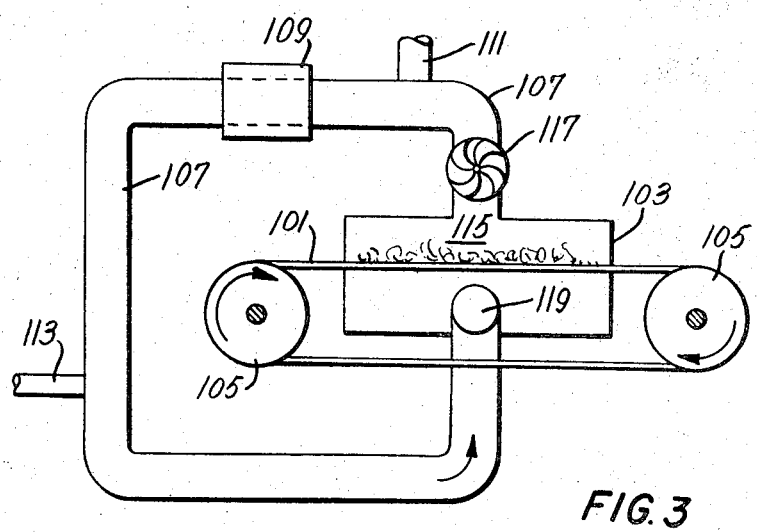
FIG. 3 illustrates a further embodiment of a conveyor belt apparatus using superheated steam to treat material.

A further embodiment of the method and apparatus of the invention is shown in FIG. 3 adapted either for continuous or batch treatment of material. A continuous conveyor belt 101 carries the material to and through a drying or treatment zone 115, formed by chamber 103. Rolls 105, at least one of which is driven, are provided for conveying the belt through the treatment zone 115. Suitable means are provided for closing off the treatment zone 115 where the conveyor belt 101 enters and leaves the chamber 103 to prevent the loss of the superheated vapor from the chamber and for feeding and removing the material from the belt conveyor. The superheated steam is recirculated through the treatment zone 115 through a circulation duct 107 and a reheater 109 by a fan 117. The recirculation duct 107 is connected laterally to chamber 103 at inlet 119 to avoid interfering with conveyor belt 101. As the steam passes into the chamber 103 and through treatment zone 115 it picks up moisture from the material conveyed on belt 101. Superheated vapor equivalent to the amount of moisture picked up from the material is bled off through a duct 111 to maintain steady-state or equilibrium conditions during drying. The initial charge of superheated steam is added to the system through line 113 as is any make-up stream if required.

In a conveyor type of dryer, the treatment zone 115 provides enough residence time for the material to achieve both pretreatment of the substance, if desired, and its drying to the desired moisture level. This can be followed by compaction and/or supplementary drying stage when so desired.

The apparatus, such as those shown in the figures, is particularly suitable for the treatment or drying of substances containing volatile materials. The volatile substances, which are picked up in the superheated steam during its passage through chamber or treatment zone are recirculated back into the chamber thus reducing any loss in flavour or quality of the product being dried. Those volatile substances passing out of the system through the bleed-off duct can also be recovered if desired.

One or more gases such as nitrogen or carbon dioxide can also be dispersed in the material prior to its introduction into the drying chamber to improve the characteristics of the material such as the organoleptic quailty of food material. Preferably the gases are introduced into the material after any pretreatment step. These gases can be introduced through a line 81 into feed line 7 as shown in FIG. 2 for example.

The bled-off steam from lines 21 or 111 can be used for thermodynamic purposes in the system other than for pretreating the feed material. In such cases, the energy required for any pretreatment of the material can be partially or completely supplied from alternative sources.

It will be obvious that the method for treatment or drying of material using superheated steam can be carried out at pressure other than atomspheric and at temperatures which can be adjusted to suit the product being treated. While the treatment or drying medium in connection with the method using the apparatus shown in FIGS. 1, 2 or 3 has been superheated steam, other suitable superheated, preferably noncondensable, vapors can be used as well in combination with superheated steam. The other noncondensable vapors are preferably inert. The treatment or drying medium can also comprise superheated steam, other noncondensable vapors or a mixture of both together with other vapors incidentally evolved from the product during processing so that the partial pressure of water in the drying medium during the carrying out of the process is a major portion of the total pressure of the medium.

We claim:

1. A method of treating material comprising circulating inert, superheated vapor through a substantially closed system, which system includes a treatment chamber, introducing material to be treated by the superheated vapor to the treatment chamber, bleeding off from the system an amount of the superheated vapor, after its passage through the chamber, the amount of bleed-off being sufficient to remove an amount of moisture from the system substantially equal to the amount of moisture removed from the material, reheating and returning the remainder of the superheated vapor, after bleed-off, to the chamber, and maintaining the vapor superheated at all times throughout the system.

2. A method as claimed in claim 1, wherein the treating of the material comprises drying it, and the vapor comprises steam.

3. A method as claimed in claim 2, wherein the product to be dried is atomizable and is sprayed into the treatment chamber, contacting the product with the superheated steam in the chamber, separately removing heavier particles of the dried material from the chamber, removing lighter dried particles with the steam at a separate location from the chamber, and separating the lighter dried particles from the superheated steam before bleeding-off a portion of the steam.

4. A method as claimed in claim 2 wherein at least a portion of the bled-off steam is used to treat the material prior to its entry into the treatment chamber.

5. A method as claimed in claim 2, wherein at least a portion of the bled-off steam is used to biologically treat and/or concentrate the material prior to its entry into the treatment chamber.

6. A method as claimed in claim 2, wherein the dried material is subjected to the further step of compaction and/or agglomeration after drying.

7. A method as claimed in claim 2, wherein the dried material is subjected to a supplementary drying step utilizing gases circulated through a supplementary dryer.

8. A method as claimed in claim 1, wherein the material is introduced and transported through the treatment chamber by means of a conveyor.

9. A method as claimed in claim 1, wherein the material being treated contains volatile substances and the volatile substances are recovered from the bled-off vapor.

10. A method as claimed in claim 3, wherein the recirculating superheated steam is filtered before being returned to the chamber.

11. A method as claimed in claim 7, wherein gases circulated through the supplementary dryer are filtered and recirculated.

12. A method as claimed in claim 5, wherein the biological treatment of the material includes at least one of: enzyme inactivation, blanching, preheating, pasteurizing or sterilization.

13. A method as claimed in claim 7, wherein the material is compacted and/or agglomerated during supplementary drying.

14. A method as claimed in claim 7, wherein the supplementary drying gases are inert.

15. An apparatus for treating material comprising a substantially closed system including a chamber, means for feeding material to be treated to the chamber, means for supplying and recirculating an inert, superheated vapor through the system including the chamber to treat the material, means for bleeding off a portion of the vapor from the system after treatment of the material, means controlling the amount of vapor bled-off to remove an amount of moisture from the system equal to the amount of moisture removed from the material, means for reheating the remainder of the vapor after bleed-off and returning it to the chamber, and means for maintaining the vapor superheated at all times throughout the system.

16. An apparatus as claimed in claim 15, including pretreatment means for treating the material prior to its entry into the chamber by at least a portion of the superheated steam bled-off from the vapor.

17. An apparatus as claimed in claim 15, wherein the chamber is a spray drying chamber which includes first means for removing heavier dried material and second means for removing a combination of lighter dried material and superheated vapor, and includes means for separating the lighter dried particles from the superheated vapor.

18. An apparatus as claimed in claim 17, including a supplementary drying means for drying the lighter material emerging from the separating means and the heavier material from the chamber, said suplementary drying means including means for recirculating a supplementary drying medium through the partially dried material for further drying of the material.

References Cited

UNITED STATES PATENTS 2,078,515  4/1937  Sutherland _____ 34—169

CHARLES SUKALO, Primary Examiner

U.S. Cl. X.R.

34—169